United States Patent
Cheng et al.

(10) Patent No.: US 9,667,854 B2
(45) Date of Patent: May 30, 2017

(54) ELECTORNIC DEVICE AND INFORMATION PROCESSING UNIT

(71) Applicants: Beijing Lenovo Software Ltd., Beijing (CN); Lenovo (Beijing) Limited, Beijing (CN)

(72) Inventors: Fei Cheng, Beijing (CN); Heng Liu, Beijing (CN); Lintao Lei, Beijing (CN); Qian Zhao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/673,113

(22) Filed: Mar. 30, 2015

(65) Prior Publication Data

US 2016/0191782 A1    Jun. 30, 2016

(30) Foreign Application Priority Data

Dec. 31, 2014  (CN) .......................... 2014 1 0857126
Dec. 31, 2014  (CN) .......................... 2014 1 0857193

(51) Int. Cl.
```
H04N 5/232    (2006.01)
H04N 1/00     (2006.01)
G06K 9/00     (2006.01)
H04N 5/225    (2006.01)
```

(52) U.S. Cl.
CPC ..... H04N 5/23212 (2013.01); G06K 9/00255 (2013.01); H04N 1/00 (2013.01); H04N 5/2258 (2013.01); H04N 5/23219 (2013.01); H04N 5/23241 (2013.01)

(58) Field of Classification Search
CPC .......... H04N 5/23212; H04N 5/23245; H04N 5/2258
See application file for complete search history.

(56) References Cited

U.S. PATENT DOCUMENTS

| | | | | |
|---|---|---|---|---|
| 2006/0066752 A1* | 3/2006 | Kelliher | ................. | G01S 19/19 |
| | | | | 348/373 |
| 2006/0133800 A1* | 6/2006 | Horii | ..................... | G03B 17/02 |
| | | | | 396/529 |
| 2011/0187866 A1* | 8/2011 | Lee | .......................... | H04N 7/18 |
| | | | | 348/159 |
| 2014/0071245 A1* | 3/2014 | Zhang | ............... | H04N 13/0025 |
| | | | | 348/47 |

* cited by examiner

*Primary Examiner* — Ahmed A Berhan
(74) *Attorney, Agent, or Firm* — Schwegman Lundberg & Woessner, P.A.

(57) ABSTRACT

The disclosure provides an electronic device, which includes a first image collecting unit; a second image collecting unit; a microprocessor connected to the first and second image collecting units; the microprocessor is configured to receive a first image collected by the second image collecting unit and to generate a control instruction if the first image is determined to satisfy a preset condition. The disclosure further provides an information processing method applied to an electronic device having a first image collecting unit and a second image collecting unit. The method includes: receiving first data transmitted from the second image collecting unit; setting a focal distance of the first image collecting unit according to the first data; controlling the first image collecting unit to perform focusing according to the focal distance.

16 Claims, 7 Drawing Sheets

ELECTORNIC DEVICE AND INFORMATION PROCESSING UNIT

TECHNICAL FIELD

This application claims the benefit under 35 U.S.C. 119 to Chinese Application No. 201410857126.0 filed on 31 Dec. 2014, and claim the benefit under 35 U.S.C. 119 to Chinese Application No. 201410857193.2 filed on 31 Dec. 2014; which applications are incorporated herein by reference in their entirety.

TECHNICAL FIELD

The disclosure generally relates to the field of electronic technology and, more particularly, to an electronic device and an information processing method.

BACKGROUND

With the continuing development of scientific technology, the face detection function has been added to more and more electronic products. For example, with the face detection function added to his smartphone, a user can make use of the function to unlock the smartphone. As such, the user's safe use of his smartphone is greatly ensured and the user's sensory experience is significantly improved.

According to one technique, in order to achieve the above effect, the smartphone is provided with a front camera which is connected to the smartphone's processor through a Mobile Industry Processor Interface (MIPI) architecture. In a specific implementation, the user firstly operates the smartphone to light its screen; after that, the user activates the face detection function of the smartphone; then, the front camera collects the current image and transmits the current image to the processor through the MIPI architecture; when the processor determines that a face exists in the current image, it controls the smartphone to release the current locked state. Thus, according to the technique, in order to control the smartphone in real time to release the current locked state by performing face detection, the front camera and the processor have to be constantly in an operating state and the MIPI architecture has to be used.

Existing focusing methods are grouped into two major classifications: one is active focusing; and the other is passive focusing. The active focusing was mainly used in legacy cameras, while the passive focusing (also known as auto-focusing) is now used in handsets, tablet computers and cameras. Typically, when a collected preview image contains a face, the electronic device will automatically recognize the face on the preview image and then place the focal plane on the face plane to complete the auto-focusing.

When implementing technical solutions according to embodiments of the disclosure, the inventors of the application find that the following technical problems exist in the prior art:

In order to control the smartphone to release the current locked state by performing face detection in real time, the smartphone has to keep the front camera and the processor operating and has to use the MIPI architecture. Because the front camera, the image processor and the MIPI architecture consume a large amount of power when operating, the overall power consumption of the smartphone is high.

In addition, there is a technical problem that, when the front camera collects the current image by performing focusing, the focusing process is slow and takes a long time.

SUMMARY

Embodiments of the disclosure provide an electronic device and an information processing method.

On one hand, the disclosure provides an electronic device, which comprises: a first image collecting unit; a second image collecting unit having a lower resolution than the first image collecting unit; a microprocessor connected to the first and second image collecting units; the microprocessor is configured to receive a first image collected by the image collecting unit and to generate a control instruction if the first image is determined to satisfy a preset condition.

Optionally, the second image collection unit is connected with the microprocessor via a serial peripheral bus, and the second image collecting unit is a camera satisfying transmission requirements of the serial peripheral bus.

Optionally, the second image collecting unit is configured to collect the first image in real time.

Optionally, the microprocessor is configured to receive the first image, to judge whether the first image satisfies the preset condition, and to generate the control instruction if the first image satisfies the preset condition.

Optionally, the electronic device further comprises a processor configured to receive and execute the control instruction to switch the processor from a sleep mode to an operating mode.

Optionally, the processor is connected to the microprocessor via an I2C serial bus.

Optionally, the electronic device further comprises a sensing unit connected with the microprocessor, and the microprocessor is further configured to execute the control instruction to control the sensing unit.

On the other hand, embodiments of the disclosure further provide an information processing method applied to an electronic device which comprises a first image collecting unit, a second image collecting unit having a lower resolution than the first image collecting unit, and a microprocessor connected to the first and second image collecting units. The method comprises: collecting a first image by the second image collecting unit; transmitting the first image to the microprocessor; judging, by the microprocessor, whether the first image satisfies a preset condition; and generating a control instruction by the microprocessor if the first image satisfies the preset condition.

Optionally, collecting the first image by the second image collecting unit comprises collecting the first image by the second image collecting unit in real time.

Optionally, the electronic device further comprises a processor connected to the microprocessor via an I2C serial bus, and the method further comprises: after the control instruction is generated by the microprocessor, transmitting the control instruction from the microprocessor to the processor to switch the processor from a sleep mode to an operating mode.

Optionally, the electronic device further comprises a sensing unit connected with the microprocessor, and the method further comprises: after the control instruction is generated by the microprocessor, executing the control instruction by the microprocessor to control the sensing unit to operate.

Optionally, the method further comprises: after the control instruction is generated by the microprocessor, executing the control instruction by the microprocessor to light a displaying unit of the electronic device.

On the other hand, embodiments of the disclosure provide an information processing method applied to an electronic device which comprises a first image collecting unit and a second image collecting unit having a lower resolution than the first image collecting unit. The method comprises:

receiving first data transmitted from the second image collecting unit;

setting a focal distance of the first image collecting unit according to the first data;

controlling the first image collecting unit to perform focusing according to the focal distance.

Optionally, the method further comprises: prior to receiving the first data transmitted from the second image collecting unit, controlling the second image collecting unit to perform focusing;

determining a focal distance of the second image collecting unit as the first data, after the second image collecting unit has completed the focusing.

Optionally, the method further comprises: prior to receiving the first data transmitted from the second image collecting unit, according to an image collected by the second image collecting unit, judging whether a target object exists in the image to obtain a first judgment result;

if the first judgment result indicates that the target object exists in the image, acquiring a distance between the target object and the second image collecting unit based on the image and using the distance as the first data.

Optionally, the method further comprises: prior to receiving the first data transmitted from the second image collecting unit, controlling the second image collecting unit to be constantly in an image collecting state.

Optionally, the method further comprises: subsequent to controlling the first image collecting unit to perform focusing according to the focal distance, acquiring a preview image by the first image collecting unit;

according to the preview image, judging whether the target object exists on a focal plane of the first image collecting unit to obtain a second judgment result;

if the second judgment result indicates that the target object does not exists on the focal plane, controlling the first image collecting unit to perform focusing in a first range, the first range is smaller than a second range in which the first image collecting unit performs pan-focusing.

Optionally, a first power consumption when the second image collecting unit is in its image collecting state is less than a second power consumption when the first image collecting unit is in its image collecting state, and the first image collecting unit and the second image collecting unit collect images along the same direction.

Optionally, the method further comprises: subsequent to controlling the first image collecting unit to perform focusing according to the focal distance or subsequent to controlling the first image collecting unit to perform focusing within the first range, collecting at least one image frame by the first image collecting unit;

generating a control instruction based on the at least one image frame to switch a state of the electronic device.

DETAILED DESCRIPTION OF EMBODIMENTS

Embodiments of the disclosure provide an electronic device and an information processing method for solving the technical problem that a large amount of power is consumed when controlling a smartphone to release a locked state by performing face detection through the use of a front camera, an image processor and a MIPI architecture and for achieving the technical effect of reducing power consumption of the electronic device.

Technical solutions according to embodiments of the disclosure solve the above technical problem based on the general concept as follows:

An electronic device comprises: a first image collecting unit; a second image collecting unit having a lower resolution than the first image collecting unit; a microprocessor connected to the first and second image collecting units, wherein the microprocessor is configured to receive a first image collected by the second image collecting unit and to generate a control instruction if the first image is determined to satisfy a preset condition.

In the above technical solution, the first image collecting unit, which is for example a front camera, and the second image collecting unit, which is for example a low-resolution camera, are arranged adjacent to each other and have overlapped views. According to the technical solution of the disclosure, the low-resolution camera is used to collect an image and transmits the image to the microprocessor, and the microprocessor wakes the processor from the sleep mode to operate when the image satisfies a certain condition. As compared with the a known technical solution where the high-resolution camera is used to collect an image and directly transmits the image through the MIPI architecture to the processor for processing and thus the processor has to operate in real time thereby causing very high power consumption of the electronic device, the technical problem of high power consumption of the electronic device can be effectively addressed and accordingly the technical effect of reducing power consumption of the electronic device is achieved.

In order to facilitate a better understanding of the above technical solution, technical solutions according to the disclosure will be described in detail in the following by way of the accompanying drawings and embodiments. It shall be appreciated that the embodiments of the disclosure and detailed features thereof are given for illustrate rather than limit the technical solutions of the disclosure. In case no conflict is incurred, technical features in different embodiments of the disclosure may be combined.

First Embodiment

In order for those skilled in the art to clearly and thoroughly understand the technical solutions according to the embodiments of the disclosure, the electronic device according to an embodiment of the disclosure will be described in conjunction with examples in the following.

Figure 1:
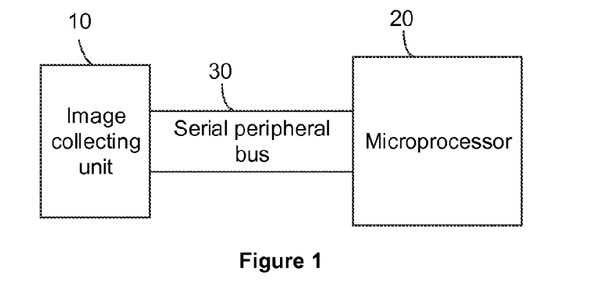
FIG. 1 is a diagram illustrating a first structure of an electronic device according to an embodiment of the disclosure.

Referring to FIG. 1, the first embodiment of the disclosure provides an electronic device, which comprises: an image collecting unit 10 (corresponding to the second image collecting unit mentioned above); a microprocessor 20; a serial peripheral bus 30 connecting the microprocessor 20 with the image collecting unit 10, wherein the microprocessor 20 is configured to receive via the serial peripheral bus 30 a first image collected by the image collecting unit 10 and to generate a control instruction when the first image is determined to satisfy a preset condition. In a specific implementation, the electronic device may be a smartphone, an Ipad or the like. The image collecting unit 10 included in the electronic device may be a camera. The microprocessor 20 may be an image microprocessor or an integrated microprocessor, which includes the image microprocessor as well as a microprocessor with some other function. The image collecting unit 10 is connected to the microprocessor 20 through the serial peripheral bus 30. By using the serial peripheral bus 30 which is characterized by high efficiency, full duplex and synchronous transmission, it is possible to significantly reduce the amount of power consumed during the transmission while ensuring the quality of the transmission. Accordingly, the overall power consumption of the electronic device can be reduced dramatically.

Further, the image collecting unit 10 is a camera satisfying transmission requirements of the serial peripheral bus. In a specific implementation, the image collecting unit 10 matches the serial peripheral bus 30. That is, data collected by the camera should satisfy requirements on data allowed to be transmitted on the serial peripheral bus 30.

Further, the image collecting unit 10 is configured to collect the first image in real time. In a specific implementation, the image collecting unit 10 is a camera capable of collecting images in real time. That is, the image collecting unit is constantly in an operating mode where it collects images in real time and transmits the images to the microprocessor 20 in real time.

Further, the microprocessor 20 is configured to receive the first image, to judge whether the first image satisfies the preset condition, and to generate the control instruction if the first image satisfies the preset condition. In a specific implementation, after receiving the image collected by the image collecting unit 10, the microprocessor 20 judges whether the image contains one or more preset characteristic points. For example, assuming the preset characteristic points are eyes and nose of a person, the microprocessor would analyze whether eyes and nose exist in the received image. If so, the microprocessor will then generate a control instruction. Of course, the control instruction may be of various types, including for example an instruction controlling the startup of the processor or an instruction controlling some other sensing unit to operate, for which no description will be given here redundantly.

Figure 2:
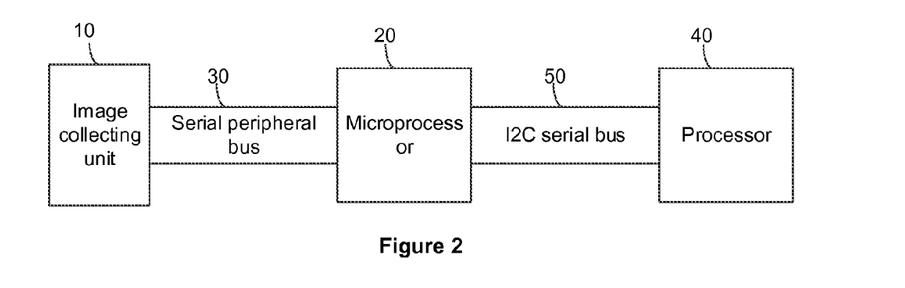
FIG. 2 is a diagram illustrating a second structure of an electronic device according to an embodiment of the disclosure.

Further, referring to FIG. 2, the electronic device further comprises a processor 40, which is configured to receive and execute the control instruction to switch the processor from a sleep mode to an operating mode. In a specific implementation, the processor 40 may be a main control chip or an image control chip for image processing in a handset. The control chip, regardless of its kind, is woken from the sleep mode and enters an operating mode, after it receives the control instruction transmitted from the microprocessor 20.

Further, referring to FIG. 2, the processor 40 is connected to the microprocessor 20 via an I2C serial bus. In a specific implementation, the processor 40 and the microprocessor 20 are connected via the I2C serial bus 50. Because the I2C serial bus 50 consumes a small amount of resources during transmission and is designed for ease of use, the overall power consumption of the electronic device can be reduced effectively. Meanwhile, because the electronic device has pre-processed data to be processed, the microprocessor transmits only data or information to be further processed to the processor, thereby significantly improving the data processing efficiency of the electronic device.

Figure 3:
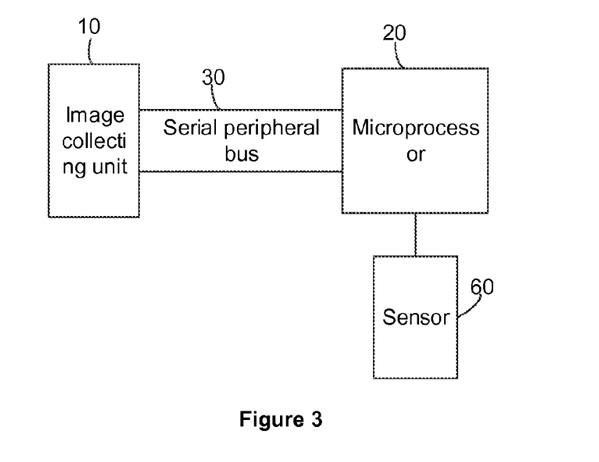
FIG. 3 is a diagram illustrating a third structure of an electronic device according to an embodiment of the disclosure.

Further, referring to FIG. 3, the electronic device further comprises a sensing unit 60 connected with the microprocessor 20, and the microprocessor is further configured to execute the control instruction to control the sensing unit. In a specific implementation, the sensing unit 60 may be an infrared sensor or a sensor with a certain function (such as an acceleration sensor or an ultrasonic sensor). Of course, the sensing unit 60 may also be some control module in the handset, such as a backlight module of the handset's screen or the like. After the microprocessor 20 generates some control instructions, it may control other sensors connected to the microprocessor 20 to operate correspondingly. For example, the microprocessor 20, instead of the main control chip of the handset, may directly control the infrared sensing unit to locate the electronic device, directly control the ultrasonic sensor to perform rangefinding, directly control the startup of the backlight module of the handset (that is, directly control the screen of the handset to light up), or the like. Here, specific implementations will not be illustrated for the above examples.

Second Embodiment

Figure 4:
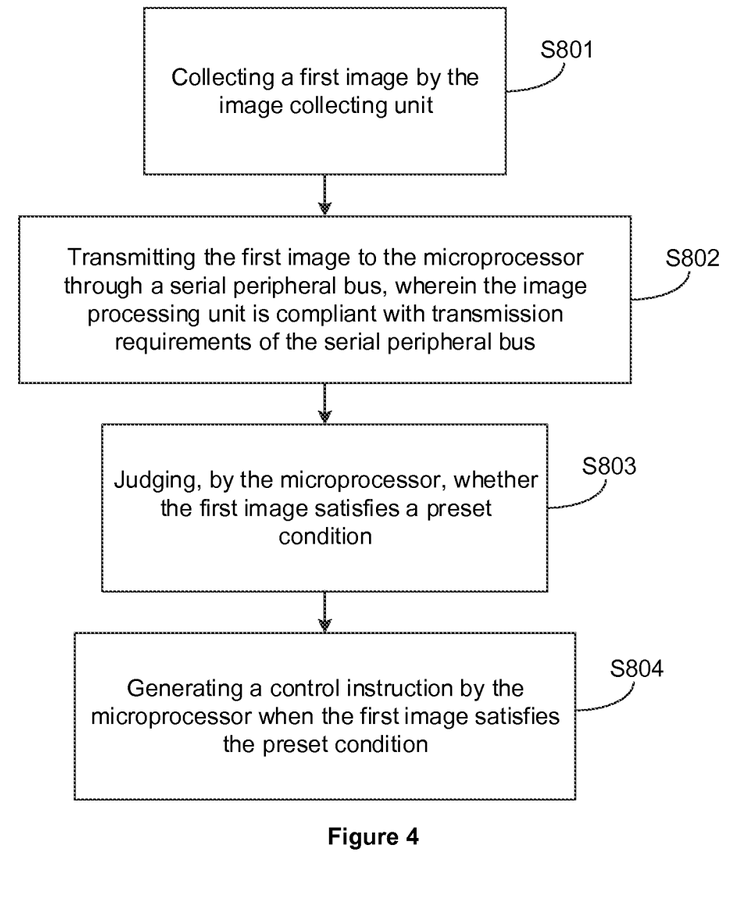
FIG. 4 is a flowchart illustrating an information processing method according to an embodiment of the disclosure.

Referring to FIG. 4, based on the same inventive concept, the disclosure further provides an information processing method applied to an electronic device which comprises a first image collecting unit, a second image collecting unit having a lower resolution than the first image collecting unit, and a processor. The method comprises:

at S801, collecting a first image by the second image collecting unit;

at S802, transmitting the first image to the microprocessor at S803, judging, by the microprocessor, whether the first image satisfies a preset condition;

at S804, generating a control instruction by the microprocessor if the first image satisfies the preset condition.

Further, step S801 comprises collecting the first image by the second image collecting unit in real time.

Figure 5:
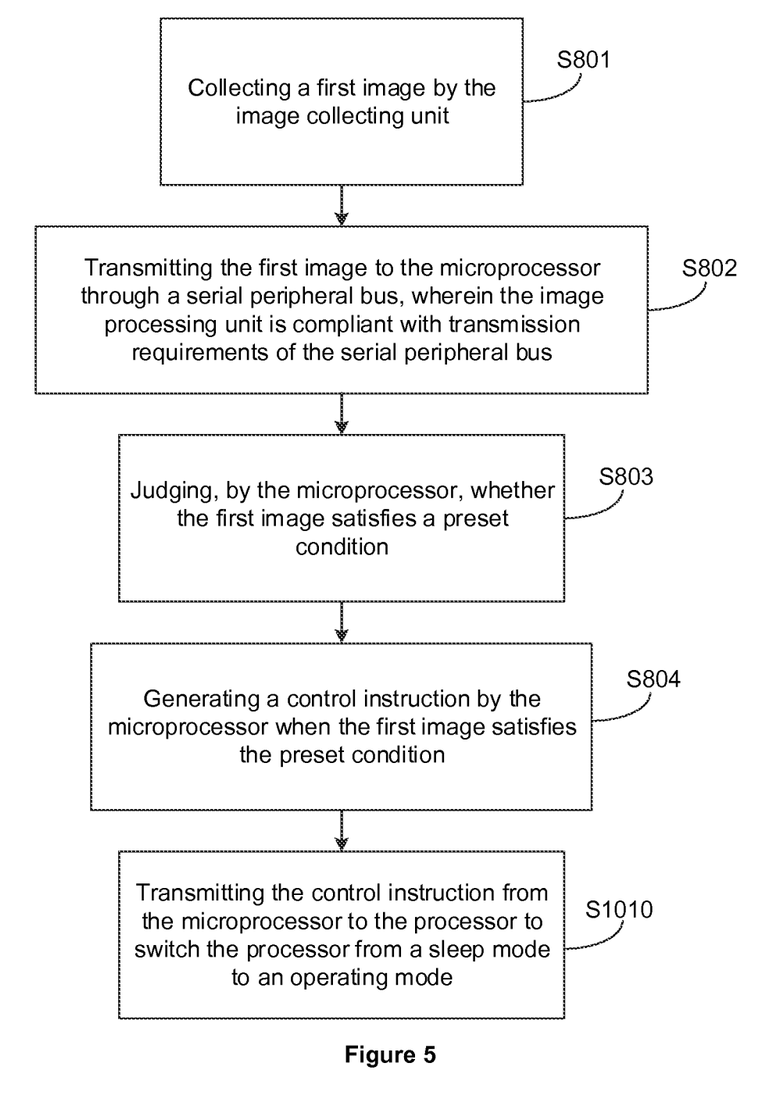
FIG. 5 is a flowchart illustrating a specific implementation of an information processing method in a first scenario according to an embodiment of the disclosure.

Further, referring to FIG. 5, the electronic device further comprises a processor, and the method further comprises step S1010 after step S804. At step S1010, the control instruction is transmitted from the microprocessor to the processor to switch the processor from a sleep mode to an operating mode.

Figure 6:
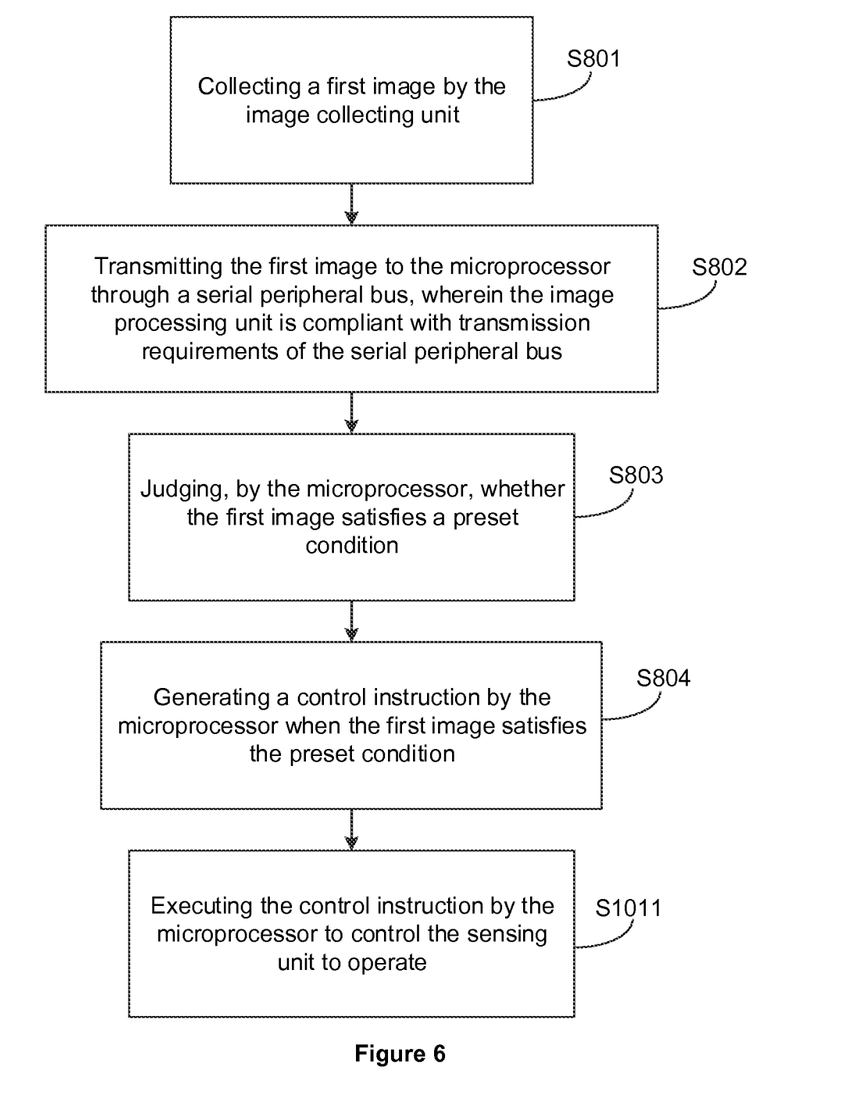
FIG. 6 is a flowchart illustrating a specific implementation of an information processing method in a second scenario according to an embodiment of the disclosure.

Further, referring to FIG. 6, the electronic device further comprises a sensing unit, and the method further comprises step S1011 after step S804. At step S1011, the control instruction is executed by the microprocessor to control the sensing unit to operate.

Figure 7:
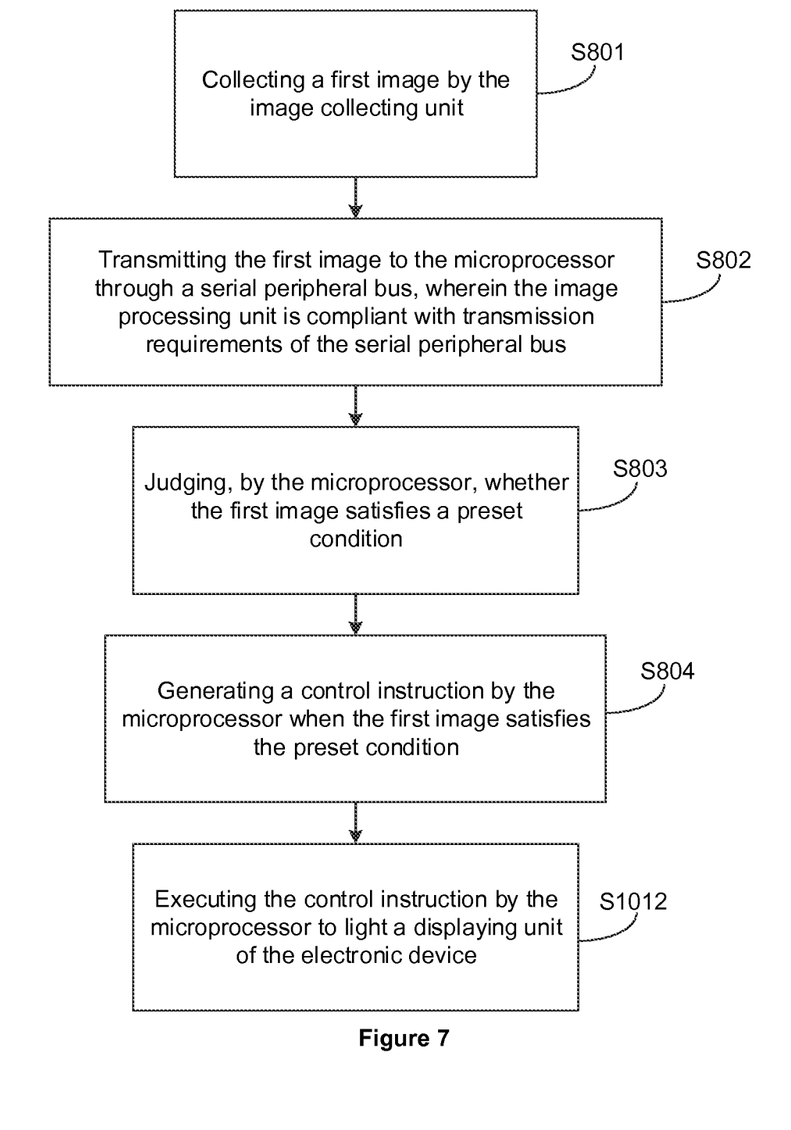
FIG. 7 is a flowchart illustrating a specific implementation of an information processing method in a third scenario according to an embodiment of the disclosure.

Further, referring to FIG. 7, the method further comprises step S1012 after step S804. At step S1012, the control instruction is executed by the microprocessor to light a displaying unit of the electronic device.

In the following, the above information processing method will be described in detail in conjunction a specific example, where a user's handset is in a standby mode at present, the screen of the handset is black and the main control chip of the handset is in a sleep mode, while the microprocessor of the handset is constantly in an operating mode and the camera of the handset is also in a real-time operating mode. When the user approaches the handset, the handset will perform step S801, at which a first image is collected by the second image collecting unit. To be specific, continuing with the above example, the camera of the handset will now collect a face image of the user in real time. Of course, the current face image just includes an outline of the face. As such, the power consumption during the image collecting process can be reduced, and the power consumption during the transmission of the image can also be reduced effectively.

After the completion of step S801, step S802 is performed, at which the first image is transmitted to the microprocessor through a serial peripheral bus, wherein the image processing unit satisfies transmission requirements of the serial peripheral bus. To be specific, continuing with the above example, after collecting the face image of the user, the camera of the handset transmits the image, through the serial peripheral bus, to the microprocessor of the handset for processing. Of course, to ensure the accuracy of image transmission, the camera of the handset shall satisfy transmission requirements of the serial peripheral bus. Meanwhile, to effectively reduce the power consumption of the handset during the transmission, the resolution of the handset's camera may be adjusted on the premise that image detection can be made. Based on specific operating parameters of the handset and according to professional experiences, those skilled in the art can set the camera in appropriate manners as required, for which no description is given here redundantly.

After the completion of step S802, step S803 is performed, at which it is judged, by the microprocessor, whether the first image satisfies a preset condition whether the first image satisfies a preset condition. To be specific, continuing with the above example, the microprocessor makes a judgment on the image. Specifically, the microprocessor judges whether the image contains preset information for determining whether the image satisfies a condition. For example, the preset condition may be eyes and nose of the user. Because the camera of the handset has been set correspondingly, the microprocessor mainly detects the outline of the user's eyes and nose. Of course, in specific implementations, the detection approach is not limited to the above-described one. For example, the microprocessor may only detect whether the image contains eyes. In this manner, it is also possible to effectively recognize the specific person and object. Accordingly, no specific limitation is set here on the detection approach.

After the completion of step S803, step S804 is performed, at which a control instruction is generated by the microprocessor when the first image satisfies the preset condition. To be specific, continuing with the above example, after the microprocessor judges that the outline is right, it generates a corresponding instruction. Of course, if the preset condition differs, the generated instruction may change accordingly. Therefore, no specific limitation is set here on the generated instruction. Moreover, due to the versatility of the control instruction, detailed specification is needed in specific implementations.

In a first case, after the completion of step S804, step S1010 is performed, at which the control instruction is transmitted from the microprocessor to the processor to switch the processor from a sleep mode to an operating mode. To be specific, continuing with the above example, because the main control chip of the handset is now in the sleep mode, the control instruction from the microprocessor may be an instruction to wake the main control chip of the handset. Then, the microprocessor transmits the control instruction to the main control chip of the handset to wake the main control chip from the sleep mode, that is, to switch the main control chip from the sleep mode to an operating mode so that the handset can be further controlled by the main control chip. To be more specific, supposing that the handset is provided with two cameras one of which is a low-resolution camera and the other of which is a high-resolution camera and that the low-resolution camera constantly operates to collect images while the high-resolution camera is in a sleep mode, then the handset, after collecting the outline of the face by using the low-resolution camera, wakes its processor, that is, the main control chip of the handset begin to work for controlling the high-resolution camera of the handset to collect a detailed face image of the user and perform face recognition.

In a second case, after the completion of step S804, step S1011 is performed, at which the control instruction is executed by the microprocessor to control the sensing unit to operate. To be specific, continuing with the above example, the control instruction from the microprocessor may be an instruction for controlling some other sensing unit. For example, in addition to the camera, the handset may be provided with some other sensors, such as an infrared sensor which locates the handset by means of infrared rays or an ultrasonic sensor which is able to measure a distance between the handset and the user by means of ultrasonic waves, all of which are connected to the microprocessor. As such, the microprocessor can directly control these sensing units without waking the main control chip, thereby dramatically reducing the power consumption of the handset. Meanwhile, the electronic device may process some data which needs not to be processed by the microprocessor, thereby significantly increasing the data processing efficiency of the electronic device.

In a second case, after the completion of step S804, step S1012 is performed, at which the control instruction is executed by the microprocessor to light a displaying unit of the electronic device. To be specific, continuing with the above example, in addition to the above steps, the microprocessor may directly control related components of the handset. For example, the microprocessor may directly control the backlight module of the handset to light up such that the screen of the handset can be switched from a black state to a bright state.

With the above one or more technical solutions according to embodiments of the disclosure, one or more of the following technical effects can be achieved:

According to a technical solution of the disclosure, a low-resolution camera is used to collect an image and transmits the image to a microprocessor via a serial peripheral bus, and the microprocessor wakes a processor from a sleep mode to operate when the image satisfies a certain condition. As compared with the known technical solution where a high-resolution camera is used to collect an image and directly transmits the image through a MIPI architecture to a processor for processing and thus the processor has to operate in real time thereby causing very high power consumption of the electronic device, the technical problem of high power consumption of the electronic device can be effectively addressed and accordingly the technical effect of reducing power consumption of the electronic device is achieved.

According to a technical solution of the disclosure, a low-resolution camera is used to collect an image and transmits the image via a serial peripheral bus to a microprocessor for processing, and the microprocessor after generating a control instruction, further controls additional sensing units connected to the microprocessor to operate. Therefore, the processor in the electronic does not need to control the additional sensing units in real time. As compared with the known technical solution where all sensing units in the electronic device are controlled by the processor thereby resulting in a long processing time required for processing a large amount of data, the technical problem of long processing time required for processing a large amount of data can be effectively addressed and accordingly the technical effect of reducing data processing time is achieved.

According to a technical solution of the disclosure, data is firstly processed by the microprocessor, and then data to be further processed is transmitted to the processor for further processing. As compared with the known technical solution where the electronic device transmits all data to the processor for processing thereby resulting in low efficient data processing, the technical problem of low efficient data processing can be effectively addressed and accordingly the technical effect of improving data processing efficiency is achieved.

The disclosure further provides an information processing method and an electronic device for solving the technical problem in the art that it takes a long time to perform focusing and for achieving the technical effect of accelerating the focusing process.

Figure 8:
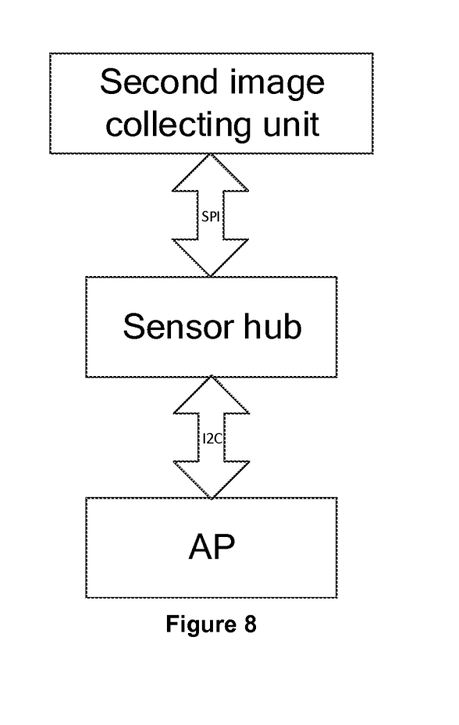
FIG. 8 is a diagram illustrating a second image collecting unit, a sensor hub and an AP connected with one another according to an embodiment of the disclosure.

FIG. 8 is a diagram illustrating a second image collecting unit, a sensor hub and an AP connected with one another according to an embodiment of the disclosure. A first image collecting unit, which is for example a front camera, and the second image collecting unit, which is for example a low-resolution camera, are arranged adjacent to each other and have overlapped views. The second image collecting unit is connected to the sensor hub of the electronic device via a Serial Peripheral Interface (SPI). The sensor hub is in turn connected to the connecting point AP of the electronic device via an Inter-Integrated circuit (I2C) in order to provide first data to the electronic device. The sensor hub is used to control the state of the second image collecting unit, and performs data processing on an image collected by the second image collecting unit to obtain the first data. With the second image collecting unit connected to the sensor hub via the SPI, even though the AP is in a sleep mode, the sensor hub can control the second image collecting unit to be constantly in an image collecting state and can perform simple image processing and make simple judgments. In practice, those skilled in the art can specify the processing and judgments as appropriate. Therefore, no specific limitation is set here.

The general concept of technical solutions according to the disclosure is as follows:

receiving first data transmitted from the second image collecting unit;

setting a focal distance of the first image collecting unit according to the first data;

controlling the first image collecting unit to perform focusing according to the focal distance.

In the technical solutions according to the disclosure, firstly, the first data transmitted from the second image collecting unit is received; then, the focal distance of the first image collecting unit is set; finally, the first image collecting unit is controlled to perform focusing according to the focal distance. In this manner, the electronic device can directly set the focusing distance, such that the first image collecting unit can directly perform focusing according to the first data without searching for the focal point and focal distance. As a result, the technical problem in the prior that it takes a long time to perform focusing is addressed, and the technical effect of accelerating the focusing process is achieved.

In order to make the objects, solutions and advantages of embodiments of the disclosure more obvious, technical solutions according to the embodiments will be described clearly and thoroughly in the following in conjunction with drawings in the embodiments. Apparently, the embodiments described here are just a selection of embodiments of the disclosure instead of all of them. All other embodiments that can be conceived of by those skilled in the art without making creative efforts fall within the protective scope of the disclosure.

The term "and/or" as used herein just describes an association between objects associated by the term and may denote three kinds of relationships. For example, A and/or B may refer to A, B or both of them. In addition, the character "/" as used herein generally denotes a logical OR relationship between two objects before and after the character.

In the following, embodiments of the disclosure will be described in detail in conjunction with drawings.

Figure 9:
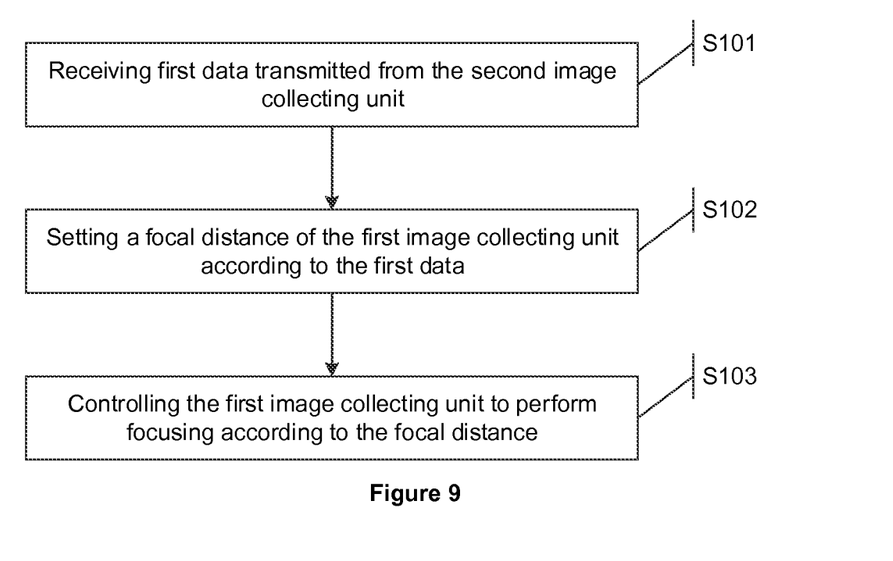
FIG. 9 is a flowchart illustrating an information processing method according to an embodiment of the disclosure.

A first aspect of the disclosure provides an information processing method. As shown in FIG. 9, the method comprises the following steps:

at S101, receiving first data transmitted from the second image collecting unit;

at S102, setting a focal distance of the first image collecting unit according to the first data;

at S103, controlling the first image collecting unit to perform focusing according to the focal distance.

To be specific, at S101, the electronic device firstly receives the first data (such as 135, 70, etc.) transmitted from the second image collecting unit. In an embodiment of the disclosure, the second image collecting unit is a camera with low resolution, for example, 160×160 pixels, fifty thousand pixels, etc.

After the first data is received at S101, the electronic device directly set the first data as the focal distance of the first image collecting unit. For example, if the first data received is 135, then the focal distance is set as 135 mm; if the first data received is 70, then the focal distance is set as 70 mm; and so forth.

At S103, when the first image collecting unit needs to collect an image, the electronic device no longer controls the first image collecting unit to perform auto-focusing or perform focusing by referring to an object, such as a face.

Instead, the electronic device controls the electronic device to perform focusing directly according to the first data.

In view of the foregoing, the electronic device directly sets the focusing distance, such that the first image collecting unit can directly perform focusing according to the first data without searching for the focal point and focal distance. As a result, the technical problem in the prior that it takes a long time to perform focusing is addressed, and the technical effect of accelerating the focusing process is achieved.

Optionally, before step S101, in order to provide the first data to the first image collecting unit, the second image collecting unit needs to first acquire the first data. In the embodiment of the disclosure, detailed description will be given with respect to approaches for the second image collecting unit to acquire the first data. In specific implementations, approaches for acquiring the first data include but not limited to the following two approaches.

The first approach comprises:

controlling the second image collecting unit to perform focusing;

determining a focal distance of the second image collecting unit as the first data, after the second image collecting unit has completed the focusing.

To be specific, before S101, the second image collecting unit is in the image collecting state and the sensor will control the second image collecting unit to perform focusing. In an embodiment of the disclosure, the means by which the second image collecting unit performs focusing may be auto-focusing or focusing based on a face or a target object (such as a mountain, a tower, etc.) In practice, those skilled in the art can make a choice as appropriate. Therefore, no specific limitation is set here.

After the second image collecting unit has completed the focusing, the sensor hub will then determine the focal distance of the second image collecting unit as the first data.

In a specific implementation, after the second image collecting unit has completed the focusing, it may or may not collect and save an image. In practice, those skilled in the art can specify whether to do so as appropriate. Therefore, no specific limitation is set here.

The second approach comprises:

according to an image collected by the second image collecting unit, judging whether a target object exists in the image to obtain a first judgment result;

if the first judgment result indicates that the target object exists in the image, acquiring a distance between the target object and the second image collecting unit based on the image;

using the distance as the first data.

To be specific, when the first image collecting unit directly acquires the image without performing focusing, the sensor hub will obtain the first data based on the image collected.

Firstly, the sensor hub judges whether the target object exists in the image. Specifically, the sensor hub performs feature matching on gray values of the image. For example, when the target object is a face, then the target features for feature matching are image features of the face; when the target object is a cup, then the target features are image features of the cup in various directions; and when the target object is a palm, then the target features are image features of the palm.

In a specific implementation, when the target object is a common object, such as a face or a palm, the electronic device may perform the matching according to target features stored in its storage space before it leaves the factory. When the target object is an object with various forms, such as a cup, a shoe, etc., the user may collect multiple image frames of the target object in advance by using the first image collecting unit and then, by editing the image frames, extract therefrom features of the target object. Finally, the target features are stored in the storage space for use by the second image collecting unit in the matching.

If there is an object satisfying the target features in the image, it indicates that the target object exists in the image and the first judgment result is affirmative. Conversely, if there is no object satisfying the target features in the image, it indicates that no target object exists in the image and the first judgment result is negative.

If the first judgment result is affirmative, the sensor hub further determines a distance between the target object and the second image collecting unit based on an area of the target object in the image. To be specific, a unit area of the target object may be prestored in the electronic device. For example, when the distance between the target object and the second image collecting unit is 10 m, the unit area is 6000 mm; when the distance between the target object and the second image collecting unit is 20 m, the unit area is 3594 mm; and so on.

When it is determined that the target object exists in the image, the distance between the target object and the second image collecting unit is determined based on a ratio between the area of the target object and the unit area. For example, assuming that the distance between the target object and the second image collecting unit is 10 cm, the unit area is 6000 mm, if the area of the target object in the image is 3522 mm, then the area of the visible target object is 0.587 times the unit area and the corresponding distance is 17.3 cm.

Subsequently, the distance between the target object and the second image collecting unit is used as the first data.

Optionally, in an embodiment of the disclosure, before S101, the second image collecting unit is constantly in the image collecting state.

To be specific, in the embodiment of the disclosure, as shown in FIG. 8, the second image collecting unit is connected to the sensor hub via the SPI. Due to the reduced resolution of the second image collecting unit, SPI may be for communications. Accordingly, in the embodiment of the disclosure, even though the electronic device itself in the sleep mode or a low power consumption mode, the sensor hub could control the second image collecting unit to be constantly in the collecting state without waking the electronic device or switching the electronic device to a high power consumption mode.

Because the second image collecting unit is constantly in the image collecting state, the sensor hub may continuously acquire the first data so that the first image collecting unit after startup can perform fast focusing according to the first data obtained by the second image collecting unit, thereby shortening the time required for focusing.

Further, after the first image collecting unit performs focusing according to the focal distance set in accordance with the first data, the focusing result may be somewhat worse than desired. Therefore, an embodiment of the disclosure further comprises:

acquiring a preview image by the first image collecting unit;

according to the preview image, judging whether the target object exists on a focal plane of the first image collecting unit to obtain a second judgment result;

if the second judgment result indicates that the target object does not exists on the focal plane, controlling the first image collecting unit to perform focusing in a first range, wherein the first range is smaller than a second range in which the first image collecting unit performs pan-focusing.

To be specific, the electronic device firstly acquires the preview image by the first image collecting unit. Then, according to the preview image, the user may judge by himself whether the focusing condition for the preview image satisfies his requirements. If the user thinks that the focal distance needs to be adjusted, then he can adjust the focal distance manually.

Alternatively, the electronic device may judge by itself whether the target object is on a focal plane of the first image collecting unit according to the preview image to obtain the second judgment result.

To be specific, firstly, a region where the target object exists is taken as the focusing region. Then, first pixel values in the focusing region which are pixel values of respective pixels within the focusing region are acquired. The pixel values are between 0-255, and first gradient information may be obtained based on contrasts and differences between adjacent pixels.

Further, a global climbing algorithm, a fast climbing algorithm or a global piecewise climbing algorithm is applied on the first gradient information to obtain at least one focusing value. The maximum focusing value found by the climbing algorithm corresponds to the focal distance. The focal distance thus obtained is the actual focal distance. Then, it is determined whether the actual focal distance is the same as the focal distance set by the electronic device according to the first data. If so, the second judgment result is affirmative; otherwise, the second judgment result is negative.

If the second judgment result is negative, the electronic device will perform focusing in the first range. Because the focal distance of the first image collecting unit is obtained by collecting images for the target object using the second image collecting unit, the target object is now very close to the focal plane even if it is not on the focal plane. Accordingly, the first image collecting unit may perform focusing in a very small range.

According to one technique, the focusing by the first image collecting unit is often done by performing pan-focusing to make the target object coincide with the focal plane. In contrast, in the embodiment of the disclosure, the first range will be smaller than the second range for performing pan-focusing, because the target object is very close to the focal plane.

In view of the foregoing, after the first image collecting unit has completed the focusing according to the set focal distance, it will further judge whether the target object is on the focal plane. When the target object is not on the focal plane, the focusing can be done in a very small range, thereby not only enabling the first image collecting unit in the embodiment of the disclosure to perform fast focusing but also ensuring that the target object is finally on the focal plane and thus ensuring the quality of the collected image.

Further, in an embodiment of the disclosure, the amount of power consumed by the second image collecting unit for collecting an image is less than the amount of power consumed by the first image collecting unit for collecting an image. Accordingly, even if the second image collecting unit is constantly in the collecting state, its power consumption is not large.

Meanwhile, in order for the first data to be close to the actual focal distance, the second image collecting unit and the first image collecting unit collect images along the same direction. In a specific implementation, the second image collecting unit and the first image collecting unit may be set on the same surface of the electronic device. For example, both the image collecting units are set on the surface on which the display screen is set. Preferably, the first image collecting unit and the second image collecting unit is set in such a manner that the distance between the first image collecting unit and the second image collecting unit is less than a threshold, such as 0.2 mm, 0.31 mm, etc. As such, the region for which the second image collecting unit collects images is closer to the region for which the first image collecting unit can collect images, thereby making the first data closer to the actual focal distance.

Optionally, an embodiment of the disclosure further comprises:

collecting at least one image frame by the first image collecting unit;

generating a control instruction based on the at least one image frame to switch a state of the electronic device.

To be specific, after the first image collecting unit is controlled to perform focusing according to the focal distance or after the first image collecting unit is controlled to perform focusing within the first range, the image collecting unit is controlled to collect at least one image frame.

For example, assuming that a handset receives an incoming call, a user picks up the handset and makes its first and second front image collecting units face towards him. Because the first image collecting unit is constantly in the image collecting state, it can acquire the distance between the second image collecting unit and the user's face. When the user starts up the first image collecting unit to collect an image for his face, the electronic device uses the distance between the second image collecting unit and the face (i.e., the first data) as the focal distance of the first image collecting unit for performing focusing. After the focusing is completed, the first image collecting unit collects an image frame of the face and the electronic device generates an answering instruction to switch the electronic device from a to-be-answered state to an answering state.

As another example, assuming a tablet computer is in a locked state, a user picks up the computer and makes its first and second front image collecting units face towards him. Because the first image collecting unit is constantly in the image collecting state, it can acquire the distance between the second image collecting unit and the user's face. When the user starts up the first image collecting unit to collect an image for his face, the electronic device uses the distance between the second image collecting unit and the face (i.e., the first data) as the focal distance of the first image collecting unit to perform focusing. Further, the first image collecting unit judges that the face is not on the focal plane, and then performs focusing in the first range. After the focusing is completed, the first image collecting unit collects at least one image frame. By identifying the at least one image frame collected, the electronic device determines that the user who is picking up the tablet computer is a user having the authority to unlock the computer, and generates an unlock instruction. Finally, the tablet computer is switched from the locked state to the unlocked state.

Figure 10:
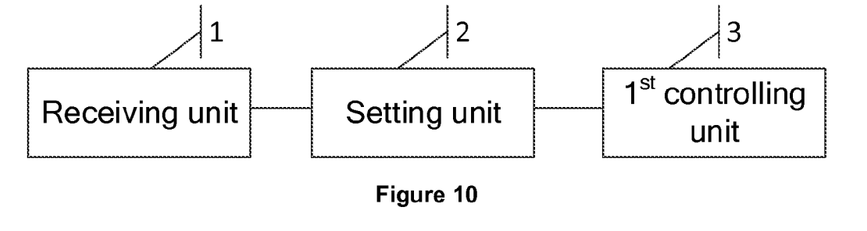
FIG. 10 is a diagram illustrating a structure of an electronic device according to an embodiment of the disclosure.

A second aspect of the disclosure provides an electronic device. As shown in FIG. 10, the electronic device comprises a first image collecting unit and a second image collecting unit having a lower resolution than the first image collecting unit, and further comprises:

a receiving unit 1 configured to receive first data transmitted from the second image collecting unit;

a setting unit 2 configured to set a focal distance of the first image collecting unit according to the first data;

a first controlling unit 3 configured to control the first image collecting unit to perform focusing according to the focal distance.

Optionally, the electronic device according to an embodiment of the disclosure further comprises:

a second controlling unit configured to control the second image collecting unit to perform focusing, before the first data transmitted from the second image collecting unit is received;

a first determining unit configured to determine a focal distance of the second image collecting unit as the first data, after the second image collecting unit has completed the focusing.

Alternatively, the electronic device further comprises:

a first judging unit configured to judge, according to an image collected by the second image collecting unit, whether a target object exists in the image to obtain a first judgment result, before the first data transmitted from the second image collecting unit is received;

a second determining unit configure to acquire a distance between the target object and the second image collecting unit based on the image and to use the distance as the first data, if the first judgment result indicates that the target object exists in the image.

Whether the electronic device further comprises the second controlling unit and the first determining unit or comprises the first judging unit and the second determining unit, in an embodiment of the disclosure, the electronic device comprises:

a state controlling unit configured to control the second image collecting unit to be constantly in an image collecting state, before the first data transmitted from the second image collecting unit is received.

Further, the electronic device further comprises:

a previewing unit configured to acquire a preview image, after the first image collecting unit is controlled to perform focusing according to the focal distance;

a second judging unit configured to judge, according to the preview image, whether the target object exists on a focal plane of the first image collecting unit to obtain a second judgment result;

the first controlling unit 3 is further configured to control the first image collecting unit to perform focusing in a first range, when the second judgment result indicates that the target object does not exists on the focal plane, wherein the first range is smaller than a second range in which the first image collecting unit performs pan-focusing.

In an embodiment of the disclosure, a first power consumption when the second image collecting unit is in its image collecting state is less than a second power consumption when the first image collecting unit is in its image collecting state, and the first image collecting unit and the second image collecting unit collect images along the same direction.

Optionally, the electronic device may further comprise:

a collection controlling unit configured to collect at least one image frame by the first image collecting unit, after the first image collecting unit is controlled to perform focusing according to the focal distance or the first image collecting unit is controlled to perform focusing within the first range;

an instructing unit configured to generate a control instruction based on the at least one image frame to switch a state of the electronic device.

The above one or more technical solutions according to embodiments of the disclosure at least have one or more of the following technical effects:

According to the technical solutions of the disclosure, firstly, the first data transmitted from the second image collecting unit is received; then, the focal distance of the first image collecting unit is set; finally, the first image collecting unit is controlled to perform focusing according to the focal distance. In this manner, the electronic device can directly set the focusing distance, such that the first image collecting unit can directly perform focusing according to the first data without searching for the focal point and focal distance. As a result, the technical problem in the prior that it takes a long time to perform focusing is addressed, and the technical effect of accelerating the focusing process is achieved.

As those skilled in the art will appreciate, the embodiments of the disclosure may be provided as methods, systems or computer program products. Thus, the disclosure may be embodied as pure hardware, pure software or a combination of software and hardware. In addition, the disclosure may be embodied as computer program products that are implemented on one or more computer-usable storage mediums (including but not limited to magnetic disk storage, CD-ROM, optical storage, etc.) containing computer-usable program codes.

The disclosure is described by referring to flowcharts and/or block diagrams of the methods, devices (systems) and computer program products according to the embodiments of the disclosure. It shall be appreciated that each flow and/or block in the flowcharts and/or block diagrams or a combination of flows and/or blocks in the flowcharts and/or block diagrams may be implemented by computer program instructions. These computer program instructions may be provided to a general-purpose computer, a specific-purpose computer, an embedded processor or some other programmable data processing device to create a machine, so that the instructions, which are executed by the processor of the computer or the programmable data processing device, create a device for realizing functions specified in one or more flows in the flowcharts and/or one or more blocks in the block diagrams.

The computer program instructions may also be stored in a computer-readable storage that can direct a computer or some other programmable data processing device to work in a specific manner, so that the instructions stored in the computer-readable storage create an article of manufacture which comprises instruction means for realizing functions specified in one or more flows in the flowcharts and/or one or more blocks in the block diagrams.

The computer program instructions may also be loaded on a computer or some other programmable data processing device, so that a series of operations are executed on the computer or the programmable data processing device to generate computer-implemented processes. As such, the instructions executed on the computer or the programmable data processing device provide steps for realizing functions specified in one or more flows in the flowcharts and/or one or more blocks in the block diagrams.

To be specific, computer program instructions which correspond to an information processing method according to an embodiment of the disclosure may be stored on a storage medium such as an optical disc, a hard disk, a USB disk, etc. When the computer program instructions in the storage medium which correspond to the information processing method according to the embodiment of the disclosure are read or executed by an electronic device which comprises a first image collecting unit, a second image collecting unit having a lower resolution than the first image collecting unit, the following steps are performed:

collecting a first image by the second image collecting unit;

transmitting the first image to the microprocessor;

judging, by the microprocessor, whether the first image satisfies a preset condition; and generating a control instruction by the microprocessor if the first image satisfies the preset condition.

Optionally, when the computer program instructions in the storage medium which correspond to the step of collecting the first image by the image collecting unit are executed, the following step is further performed: collecting the first image by the image collecting unit in real time.

Optionally, when the computer program instructions in the storage medium which correspond to the method are executed and the electronic device further comprises a processor connected to the microprocessor via an I2C serial bus, the following step is further performed: after the control instruction is generated by the microprocessor, transmitting the control instruction from the microprocessor to the processor to switch the processor from a sleep mode to an operating mode.

Optionally, when the computer program instructions in the storage medium which correspond to the method are executed and the electronic device further comprises a sensing unit connected with the microprocessor, the following step is further performed: after the control instruction is generated by the microprocessor, executing the control instruction by the microprocessor to control the sensing unit to operate.

Optionally, when the computer program instructions in the storage medium which correspond to the method are executed, the following step is further performed: after the control instruction is generated by the microprocessor, executing the control instruction by the microprocessor to light a displaying unit of the electronic device.

Computer program instructions which correspond to an information processing method according to an embodiment of the disclosure may be stored on a storage medium such as an optical disc, a hard disk, a USB disk, etc. When the computer program instructions in the storage medium which correspond to the information processing method according to the embodiment of the disclosure are read or executed by an electronic device which comprises a first image collecting unit and a second image collecting unit having a lower resolution than the first image collecting unit, the following steps are performed:

receiving first data transmitted from the second image collecting unit;

setting a focal distance of the first image collecting unit according to the first data;

controlling the first image collecting unit to perform focusing according to the focal distance.

Optionally, the storage medium has additional computer instructions stored thereon, which are executed prior to the step of receiving the first data transmitted from the second image collecting unit. When the additional computer instructions are executed, the following steps are further performed:

controlling the second image collecting unit to perform focusing;

determining a focal distance of the second image collecting unit as the first data, after the second image collecting unit has completed the focusing.

Optionally, the storage medium has additional computer instructions stored thereon, which are executed prior to the step of receiving the first data transmitted from the second image collecting unit. When the additional computer instructions are executed, the following steps are further performed:

according to an image collected by the second image collecting unit, judging whether a target object exists in the image to obtain a first judgment result;

if the first judgment result indicates that the target object exists in the image, acquiring a distance between the target object and the second image collecting unit based on the image and using the distance as the first data.

Optionally, the storage medium has additional computer instructions stored thereon, which are executed prior to the step of receiving the first data transmitted from the second image collecting unit. When the additional computer instructions are executed, the following step is further performed:

controlling the second image collecting unit to be constantly in an image collecting state.

Optionally, the storage medium has additional computer instructions stored thereon, which are executed after the step of controlling the first image collecting unit to perform focusing according to the focal distance. When the additional computer instructions are executed, the following steps are further performed:

acquiring a preview image by the first image collecting unit;

according to the preview image, judging whether the target object exists on a focal plane of the first image collecting unit to obtain a second judgment result;

if the second judgment result indicates that the target object does not exists on the focal plane, controlling the first image collecting unit to perform focusing in a first range, wherein the first range is smaller than a second range in which the first image collecting unit performs pan-focusing.

Optionally, a first power consumption when the second image collecting unit is in its image collecting state is less than a second power consumption when the first image collecting unit is in its image collecting state, and the first image collecting unit and the second image collecting unit collect images along the same direction.

Optionally, the storage medium has additional computer instructions stored thereon, which are executed after the step of controlling the first image collecting unit to perform focusing according to the focal distance or the step of controlling the first image collecting unit to perform focusing within the first range. When the additional computer instructions are executed, the following steps are further performed:

collecting at least one image frame by the first image collecting unit;

generating a control instruction based on the at least one image frame to switch a state of the electronic device.

Obviously, those skilled in the art can make various alterations and changes to the disclosure without departing from the spirit and scope thereof. Thus, if these alterations and changes fall within the scope of the claims and the technical equivalents thereof, they are intended to be covered by the disclosure.

What is claimed is:

1. An electronic device, comprising:
a first image collecting unit configured to acquire a preview image;
a second image collecting unit having a lower resolution than the first image collecting unit;
a microprocessor connected to the first and second image collecting units;

wherein the microprocessor is configured to receive a first image collected by the second image collecting unit and to generate a control instruction if the first image is determined to contain one or more preset characteristic point, wherein the electronic device further comprises a processor configured to receive and execute the control instruction to switch the processor from a sleep mode to an operating mode, wherein the processor is further configured to:

according to the preview image, judge whether a target object exists on a focal plane of the first image collecting unit to obtain a second judgement result; and if the second judgment result indicates that the target object does not exists on the focal plane, control the first image collecting unit to perform focusing in a first range, and wherein the first range is smaller than a second range in which the first image collecting unit performs pan-focusing.

2. The electronic device according to claim 1, wherein the second image collecting unit is connected with the microprocessor via a serial peripheral bus, and the second image collecting unit is a camera satisfying transmission requirements of the serial peripheral bus.

3. The electronic device according to claim 2, wherein the second image collecting unit is configured to collect the first image in real time.

4. The electronic device according to claim 3, wherein the microprocessor is configured to receive the first image, to judge whether the first image contains one or more preset characteristic points, and to generate the control instruction if the first image contains one or more preset characteristic points.

5. The electronic device according to claim 4, wherein the electronic device further comprises a sensing unit connected with the microprocessor, and the microprocessor is further configured to execute the control instruction to control the sensing unit.

6. The electronic device according to claim 1, wherein the processor is connected to the microprocessor via an I2C serial bus.

7. An information processing method applied to an electronic device which comprises a first image collecting unit, a second image collecting unit having a lower resolution than the first image collecting unit, and a microprocessor connected to the first and second image collecting units, the method comprising:

collecting a first image by the second image collecting unit;

transmitting the first image to the microprocessor;

judging, by the microprocessor, whether the first image contains one or more preset characteristic points; and generating a control instruction by the microprocessor if the first image contains one or more preset characteristic points, wherein the electronic device further comprises a processor connected to the microprocessor via an I2C serial bus, and the method further comprises: after the control instruction is generated by the microprocessor, transmitting the control instruction from the microprocessor to the processor to switch the processor from a sleep mode to an operating mode, wherein the method further comprises:

acquiring a preview image by the first image collecting unit;

according to the preview image, judging whether a target object exists on a focal plane of the first image collecting unit to obtain a second judgment result; and if the second judgement result indicates that the target object does not exists on the focal plane, controlling the first image collecting unit to perform focusing in a first range, and wherein the first range is smaller than a second range in which the first image collecting unit performs pan-focusing.

8. The method according to claim 7, wherein the collecting the first image by the second image collecting unit comprises collecting the first image by the second image collecting unit in real time.

9. The method according to claim 8, wherein the electronic device further comprises a sensing unit connected with the microprocessor, and the method further comprises:

after the control instruction is generated by the microprocessor, executing the control instruction by the microprocessor to control the sensing unit to operate.

10. The method according to claim 8, further comprising:

after the control instruction is generated by the microprocessor, executing the control instruction by the microprocessor to light a displaying unit of the electronic device.

11. An information processing method applied to an electronic device which comprises a first image collecting unit and a second image collecting unit having a lower resolution than the first image collecting unit, the method comprising:

receiving first data transmitted from the second image collecting unit;

setting a focal distance of the first image collecting unit according to the first data; and controlling the first image collecting unit to perform focusing according to the focal distance;

acquiring a preview image by the first image collecting unit;

according to the preview image, judging whether a target object exists on a focal plane of the first image collecting unit to obtain a second judgment result; and if the second judgment result indicates that the target object does not exists on the focal plane, controlling the first image collecting unit to perform focusing in a first range, wherein the first range is smaller than a second range in which the first image collecting unit performs pan-focusing.

12. The method according to claim 11, further comprising:

prior to receiving the first data transmitted from the second image collecting unit, controlling the second image collecting unit to perform focusing; and determining a focal distance of the second image collecting unit as the first data, after the second image collecting unit has completed the focusing.

13. The method according to claim 11, further comprising:

prior to receiving the first data transmitted from the second image collecting unit, according to an image collected by the second image collecting unit, judging whether a target object exists in the image to obtain a first judgment result; and if the first judgment result indicates that the target object exists in the image, acquiring a distance between the target object and the second image collecting unit based on the image and using the distance as the first data.

14. The method according to claim 11, further comprising:
prior to receiving the first data transmitted from the second image collecting unit, controlling the second image collecting unit to be constantly in an image collecting state.

15. The method according to claim 11, wherein a first power consumption when the second image collecting unit is in its image collecting state is less than a second power consumption when the first image collecting unit is in its image collecting state, and the first image collecting unit and the second image collecting unit collect images along the same direction.

16. The method according to claim 11, further comprising:
subsequent to controlling the first image collecting unit to perform focusing according to the focal distance or subsequent to controlling the first image collecting unit to perform focusing within the first range, collecting at least one image frame by the first image collecting unit; and
generating a control instruction based on the at least one image frame to switch a state of the electronic device.

* * * * *